United States Patent [19]

Mattheyses

[11] Patent Number: 4,858,106

[45] Date of Patent: Aug. 15, 1989

[54] AUTOMATED METHOD IMPLEMENTED ON A DISTRIBUTED DATA PROCESSING SYSTEM FOR PARTITIONING A DATA STRING INTO TWO SUBSTRINGS

[75] Inventor: Robert M. Mattheyses, Schenectady, N.Y.

[73] Assignee: General Electric Company, Schenectady, N.Y.

[21] Appl. No.: 33,939

[22] Filed: Apr. 3, 1987

[51] Int. Cl.$^4$ .......................... G06F 7/08; G06F 7/20
[52] U.S. Cl. ..................................... 364/200; 364/300
[58] Field of Search ... 364/200 MS File, 900 MS File

[56] References Cited

U.S. PATENT DOCUMENTS

| | | | |
|---|---|---|---|
| 3,242,466 | 3/1966 | Dirks | 364/900 |
| 3,654,621 | 4/1972 | Bock et al. | 364/200 |
| 4,163,281 | 7/1979 | Stringa | 364/200 |
| 4,318,184 | 3/1982 | Millet et al. | 364/900 |
| 4,425,617 | 1/1984 | Sterwood | 364/200 |
| 4,463,424 | 7/1984 | Mattson et al. | 364/300 |
| 4,464,732 | 8/1984 | Clark | 364/900 |
| 4,468,728 | 8/1984 | Wang | 364/200 |
| 4,575,798 | 3/1986 | Lindstrom et al. | 364/200 |
| 4,606,002 | 8/1986 | Waisman et al. | 364/200 |
| 4,611,280 | 9/1986 | Linderman | 364/300 |
| 4,630,234 | 12/1986 | Holly | 364/900 |
| 4,633,431 | 12/1986 | Bar | 364/900 |
| 4,725,890 | 6/1988 | Natarajan et al. | 364/513 |
| 4,739,476 | 4/1988 | Fiduccia | 364/200 |
| 4,758,947 | 7/1988 | Levendel et al. | 364/200 |

OTHER PUBLICATIONS

Blasgeu et al., "An Encoding Method for Multifield Sorting and Indexing", Communications of the ACM, vol. 20, No. 11, Nov. 1977, pp. 874–878.

"Data Parallel Algorithms", by W. D. Hillis et al., Communications of the ACM, December 1986, vol. 29, No. 12, pp. 1170–1183.

U.S. patent application Ser. No. 065,997 filed 6/24/87 entitled: "Histogramming of Pixel Values on a Distributed Processing System".

*Primary Examiner*—Archie E. Williams, Jr.
*Assistant Examiner*—Danh T. Phung
*Attorney, Agent, or Firm*—Henry I. Steckler; James C. Davis, Jr.; Paul R. Webb, II

[57] ABSTRACT

A method for partitioning an original string of data elements into two substrings on a distributed processing system is disclosed. The elements are each of a first or a second type and the original string consists of a plurality of string fragments each composed of elements of only one type. The method operates to pass the identity of each fragment tail element to the head element of the next fragment, further from a true head element of the original string, composed of the same type elements as the tail element. The passed identities enable forming the two substrings from fragments of the same type elements.

8 Claims, 8 Drawing Sheets

FIG. 6a

| Col. 300 | Col. 302 Temporary Pointer 252 | Col. 304 Fragment Head Indicator 254 | Col. 306 First Tag 256 | Col. 308 Second Tag 258 |
|---|---|---|---|---|
| OA1  | –   | – | – | – |
| OA2  | A1  | – | – | – |
| OB3  | A2  | – | – | – |
| OB4  | B3  | – | – | – |
| OB5  | B4  | – | – | – |
| OB6  | B5  | – | – | – |
| OA7  | B6  | – | – | – |
| OB8  | A7  | – | – | – |
| OB9  | B8  | – | – | – |
| OB10 | B9  | – | – | – |
| OA11 | B10 | – | – | – |
| OA12 | A11 | – | – | – |
| OA13 | A12 | – | – | – |

FIG. 6b

| Col. 300 | Col. 302 Temporary Pointer 252 | Col. 304 Fragment Head Indicator 254 | Col. 306 First Tag 256 | Col. 308 Second Tag 258 |
|---|---|---|---|---|
| OA1  | –   | – | S | S |
| OA2  | A1  | – | – | – |
| OB3  | A2  | S | S | – |
| OB4  | B3  | – | – | – |
| OB5  | B4  | – | – | – |
| OB6  | B5  | S | S | – |
| OA7  | B6  | S | S | – |
| OB8  | A7  | – | – | – |
| OB9  | B8  | – | – | – |
| OB10 | B9  | S | S | – |
| OA11 | B10 | – | – | – |
| OA12 | A11 | – | – | – |
| OA13 | A12 | – | – | – |

FIG. 6c

| Col. 300 | Col. 302 Temporary Pointer 252 | Col. 304 Fragment Head Indicator 254 | Col. 306 First Tag 256 | Col. 308 Second Tag 258 |
|---|---|---|---|---|
| OA1  | –   | – | S | S |
| OA2  | –   | – | S | S |
| OB3  | A2  | S | S | – |
| OB4  | A2  | – | S | – |
| OB5  | B3  | – | – | – |
| OB6  | B4  | – | – | – |
| OA7  | B6  | S | S | – |
| OB8  | A7  | S | S | – |
| OB9  | A7  | – | – | – |
| OB10 | B8  | – | S | – |
| OA11 | B10 | S | S | – |
| OA12 | B10 | – | – | – |
| OA13 | A11 | – | – | – |

FIG. 6d

| Col. 300 | Col. 302 Temporary Pointer 252 | Col. 304 Fragment Head Indicator 254 | Col. 306 First Tag 256 | Col. 308 Second Tag 258 |
|---|---|---|---|---|
| OA1  | –   | – | S | S |
| OA2  | –   | – | S | S |
| OB3  | A2  | S | S | – |
| OB4  | A2  | – | S | – |
| OB5  | A2  | – | S | – |
| OB6  | A2  | – | S | – |
| OA7  | B6  | S | S | – |
| OB8  | A7  | S | S | – |
| OB9  | A7  | – | S | – |
| OB10 | A7  | – | S | – |
| OA11 | B10 | S | S | – |
| OA12 | B10 | – | S | – |
| OA13 | B10 | – | S | – |

FIG. 9

| ORIGINAL STRING ELEMENTS | POINTER 162 VALUE |
|---|---|
| A1 | – |
| A2 | A1 |
| B3 | – |
| B4 | B3 |
| B5 | B4 |
| B6 | B5 |
| A7 | A2 |
| B8 | B6 |
| B9 | B8 |
| B10 | B9 |
| A11 | A7 |
| A12 | A11 |
| A13 | A12 |

AUTOMATED METHOD IMPLEMENTED ON A DISTRIBUTED DATA PROCESSING SYSTEM FOR PARTITIONING A DATA STRING INTO TWO SUBSTRINGS

The present invention is directed in general to methods for solving problems on a distributed processing system and, more specifically, to a method for manipulating data strings on a distributed processing system.

BACKGROUND OF THE INVENTION

Distributed processing system is used herein to describe a system in which a plurality of independent, interconnected, arithmetical-logical processor elements operate in parallel to perform a multiplicity of processing functions. The processors in the system are, typically, substantially identical to one another. The processors are preferably interconnected in a manner enabling communication between any pair of processors. In one type of parallel processing system known in the art as a single instruction multiple data (SIMD) system, a single sequence of instructions is provided to all processors. That is, all processors simultaneously receive and perform operations in accordance with the same sequence of instructions. However, each processor may be performing the operations dictated by the instructions on a different set of data.

The individual processors of a SIMD parallel processing system typically have dedicated memory which may be loaded with data on which instructed operations can be performed. Also, each processor can perform operations on data transmitted to it from another processor. Thus, there is a flexibility in operations performed by each processor insofar as derives from varying the data upon which each element operates.

Various types of calculations are especially well suited for processing on a distributed processing system. Image processing is one such calculation that is well suited for and facilitated by processing on a distributed processing system. Frequently, calculations performed on a distributed processing system include manipulation of data strings. A data string as used herein is a sequence of data elements in which each string element is related to the next element in the string by means such as a pointer. One type of string manipulation that is common is the partitioning of the data string into a plurality of substrings according to some characteristic of each string element. For example, it may be desirable to regroup the string elements so that elements having a common value are grouped together. Such regrouping is preferably performed while maintaining the relative order of the element as existed in the original data string before partitioning.

Since distributed processing systems are often employed to process large amounts of data, it is always desirable to provide means for performing processing more quickly. With respect to an operation such as string partitioning, it is highly desirable to provide a method for performing the partitioning as rapidly as possible.

It is therefore a principal object of the present invention to provide an efficient method for the rapid partitioning of data strings on a distributed processing system.

SUMMARY OF THE INVENTION

In accordance with the present invention, there is provided a method for partitioning an original string of data elements into two substrings on a distributed processing system. Each element comprises a first pointer having a value that identifies an immediately succeeding element in the original string closer to a true head element thereof. Each element is of a first type or a second type. The original string is composed of at least one string fragment, each fragment being composed of a sequence of elements of the same type, the type of element in each fragment being different from that of the fragment immediately adjacent thereto in the original string. Each of the two substrings into which the original string is partitioned has only elements of the same type.

The distributed processing system comprises a plurality of processors intercoupled to communicate with one another. Each processor comprises processing means for performing arithmetic and logic functions and memory means for storing information. The processing system is responsive to a single sequence of instructions applied in parallel to all of the processors. Thus, each step of the method is performed in parallel at all elements in the original string, subject to determination of a prescribed condition at each element. Before commencement of partitioning, each element of the original string is stored in the memory means of a different one of the processors in the processing system.

The method commences with copying at all elements the value of the first pointer into a second pointer. Next, it is determined at all elements except the true head element of the original string if the immediately succeeding element is of the same type as itself. Following this determination, the first tag is set at all elements for which it was determined that the immediately succeeding element is not the same type as itself, each element so setting its first tag being a string fragment head element. A first and second tag are set only at the true head element of the original string. Each element with its first tag set or not set is respectively referred to as a tagged or untagged element.

At the next step, all untagged elements get the values of the second pointer, first tag, and second tag from the element currently identified by the second pointer of the untagged element and the values so obtained from the currently identified element are respectively substituted for the values of the second pointer, first tag and second tag of the untagged element. The immediately preceding getting and substituting steps are repeated until all elements in the original string are tagged.

Next, only fragment head elements determine if the second tag is set at the immediately succeeding element in the original string and, if so set, further determine that it is a substring head element.

Then, only fragment head elements are the value of the second pointer of the immediately succeeding element in the original string, that pointer being a substring pointer identifying the element at a tail of a next string fragment, closer to the true head element, having elements of the same type as the fragment head element. The fragments are then joined by the substring pointers to form two substrings, the head of one having its true head indicator set and the head of the other having been determined in an earlier step.

In an illustrated embodiment of the present invention, upon determining that one fragment is set at that element. The true head indicator of the true head element of the original string is set prior to commencement of the method. As a result, the true head indicator of each substring head element is set.

The method of the present invention partitions the data string in a number of message cycles proportional to [log$_2$(n)] where n is the number of data elements in the longest string fragment and a message cycle is the time required, in the distributed processing system, to communicate a collection of messages to their respective destinations. It is noted that the time required for a message cycle will vary according to the hardware structure that supports communication between processors and the particular pattern of such communication.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which:

FIG. 6, consisting of FIGS. 6a, 6b, 6c, and 6d, illustrates the successive steps of partitioning the data string illustrated in FIG. 4a in accordance with the method of the present invention;

FIG. 9 illustrates a further step of partitioning the data string illustrated in FIG. 4a in accordance with the method of the present invention.

DESCRIPTION OF THE INVENTION

Figure 1A:
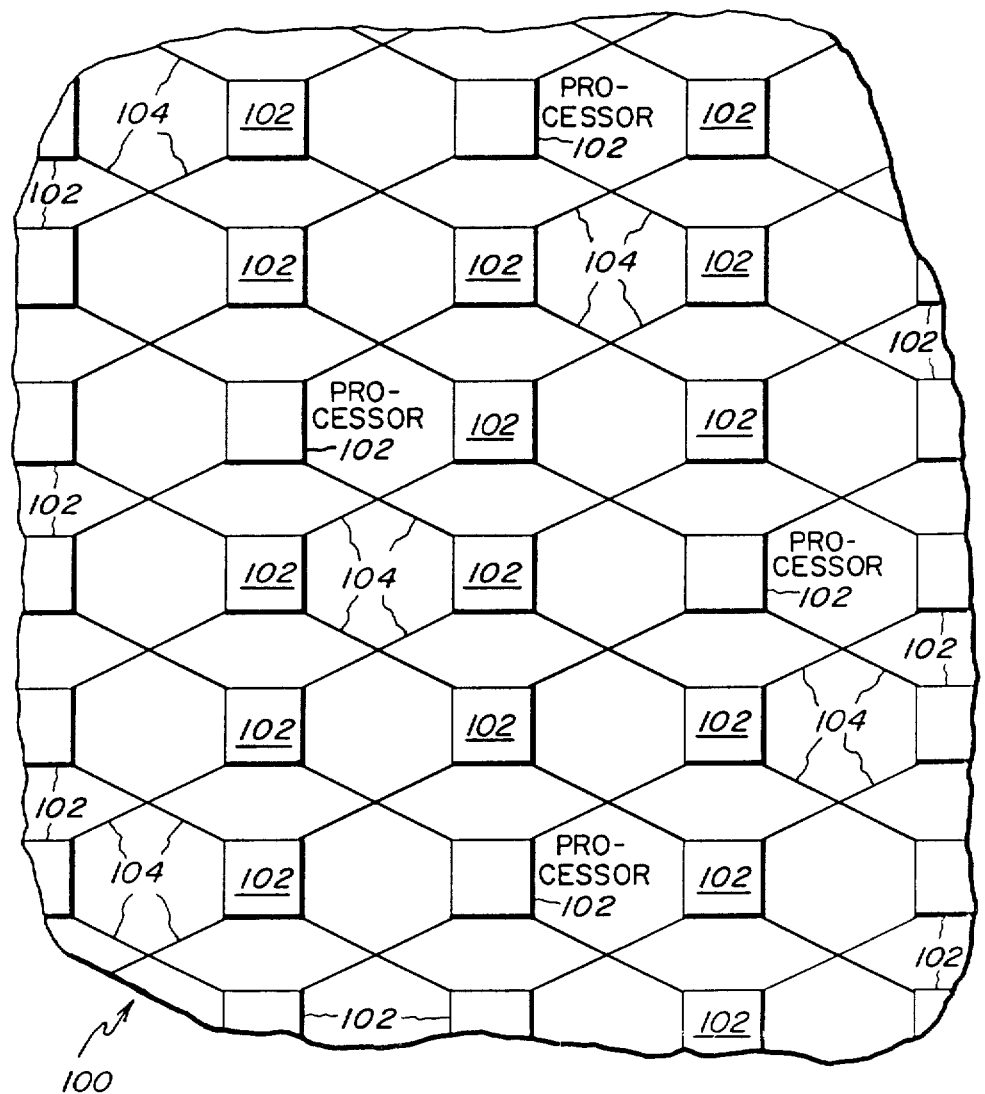
FIGS. 1a and 1b illustrate an exemplary distributed processing system, and processing element thereof, on which the method of the present invention may be practiced.
Figure 1B:
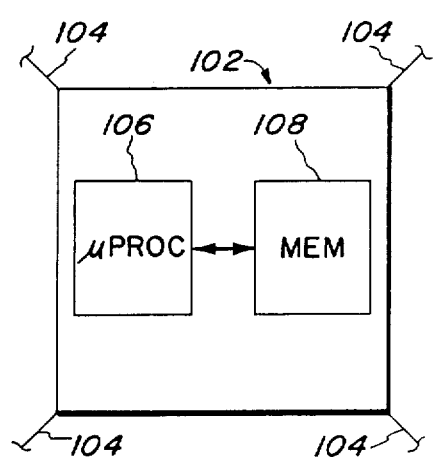

Referring now to the drawings, FIG. 1a illustrates an exemplary distributed processing system 100 on which the method of the present invention may be practiced. System 100 comprises a plurality of processors 102 which are locally interconnected through connections 104. Processors 102 are further interconnected by means of a self-routing communication network, not shown, that enables any processor 102 in system 100 to communicate with any other processor in the system. Such a communication network may simply comprise a cross bar network, well known in the art, in which every processor is connectable to every other processor through a controllable switch. More sophisticated communication networks, known in the art, may instead be used to enable more efficient communication between the processors. Each processor includes processing means, such as microprocessor, for manipulating data to perform arithmetic and logic operations. Each processor further includes dedicated memory which may be used, for example, for the storage of data upon which the processing means performs operations. FIG. 1b illustrates an exemplary processor 102 comprising a microprocessor 106 ($\mu$PROC) and a memory 108 (MEM) Distributed processing systems of the type that may be used in practicing the method of the present invention are described in detail in "The Connection Machine" by W. D. Hillis, The MIT Press, 1985.

It is intended for the practice of the present invention that system 100 be of the SIMD type. That is, it is intended that a single set of instructions be applied in parallel to all processors 102 in system 100. The means by which programmed instructions are converted to a suitable coded form and applied in parallel to the elements of the distributed processing system are well known in the art and are therefore not described in detail herein.

Figure 2:
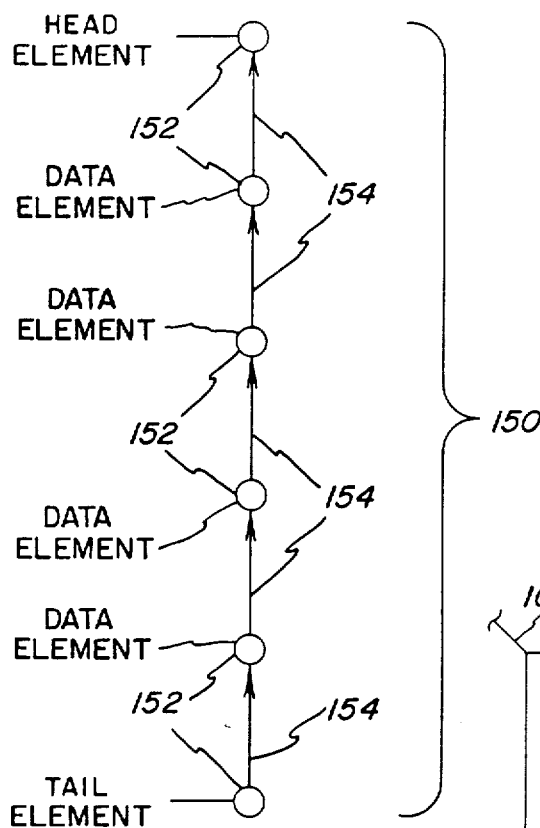
FIG. 2 illustrates an exemplary data string.

The present invention provides an efficient method for the rapid partitioning of a data string on a distributed processing system such as system 100. As described above, the string consists of a sequence of data elements each related to the next element in the string by a pointer. FIG. 2 provides a diagrammatic illustration of an exemplary data string 150 consisting of a plurality of string elements 152. Each element 152 includes a printer 154 pointing to an immediately succeeding element in the string. All elements point toward a "head" of the string and, hence, away from a "tail" of the string. As a result, the element at the head of the string can be referred to as a head element and the element at the tail of the string can be referred to as a tail element.

Figure 3:
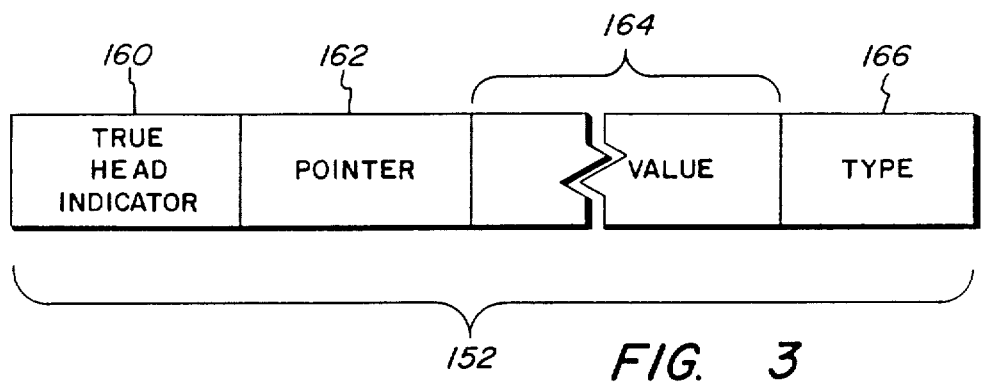
FIG. 3 illustrates an exemplary data element such as may be included in a data string.

FIG. 3 illustrates an exemplary one of string elements 152. The element includes a true head indicator portion 160 which indicates if the particular element is located at the true "head" of the string. The element further includes a pointer 162 which has a value effective to identify the next, immediately succeeding element in the string closer to the head of the string. It is preferred herein to store the respective elements of the data string in the respective dedicated memories of processors 102, with one string element allocated to a single processor memory, and hence to a single processor. The number of processors in system 100 must therefore be greater than or equal to the number of elements in the string being partitioned. Each pointer 162 may simply contain the indentity of the processor in whose memory the next, immediately succeeding element in the string is stored. It is a property of the data string that each element carries only the identity of the next element in the string and no other element identities.

A value field 164 contains the substantive data of element 152. Value field 164 may be of any size depending on the nature of the data being carried by the string. For example, in the case of image processing data, the value field of each string element may hold pixel color or gray shade data. As stated above, it is frequently desirable to partition a string into substrings according to some inherent characteristic of each string element. The characteristic data on which the string is partitioned is an arbitrary choice based on the nature of the data processing to be performed. The partitioning method of the present invention operates to partition a data string into two substrings such that one substring only contains elements of a first predetermined type and the other substring only contains elements of a second predetermined type. Thus, each element in the string must be assigned to be of a first or a second type, before partitioning is commenced, according to some inherent characteristic. For example, if each string element contains an intensity value, then each element could be assigned as being of a first or second type depending on whether its intensity value is respectively greater than or less than some arbitrary intensity value. Another example would be to assign a type to each element according to whether a number in its value field is odd or even. For the purpose of the partitioning method of the present invention, it is assumed that the assignment of types to the elements of the data string is complete before partitioning is commenced. A type field 166 is provided as part of string element 152 to indicate which of the two possible types the element is.

Figures 4A, 4B:
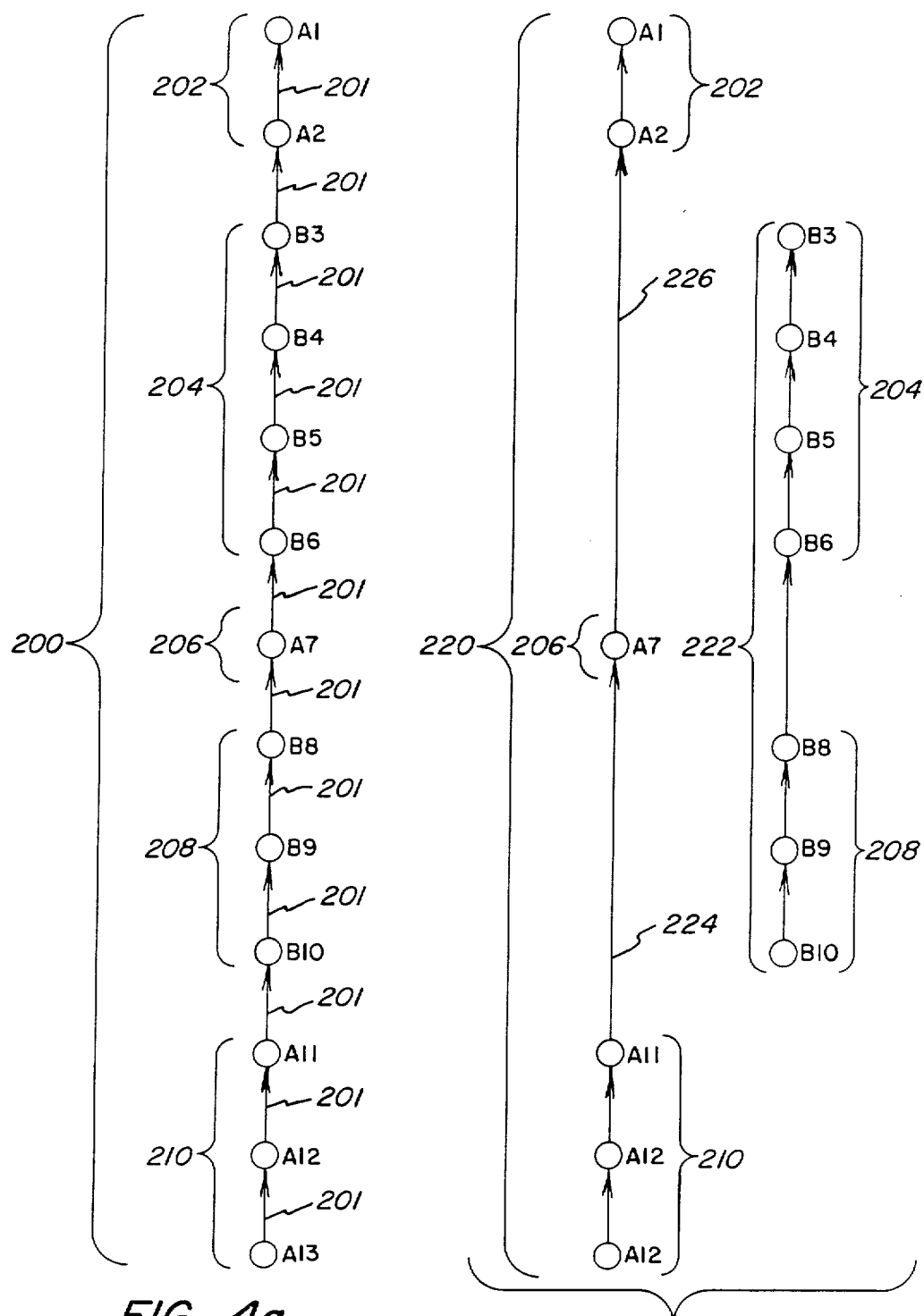
FIG. 4, consisting of FIGS. 4a and 4b, illustrates the partitioning of a data string.

FIG. 4a illustrates an exemplary string 200 in which elements are individually labelled to facilitate description of additional string characteristics. Thus, element A1 is the head element of string 200. Head indicator 160 (FIG. 3) of element of A1 would be set to indicate it is the true head element of string 200. Each element in string 200 would carry in its pointer 162 (FIG. 3) a value identifying the immediately succeeding element in the string. For example, element B8 would carry a pointer value identifying element A7. Pointers 201 are provided to diagrammatically illustrate the value of the pointer carried by each element of string 200. The element labelling in FIG. 4a identifies each element as either an "A" type or "B" type. Thus, as described above, each element in string 200 is of a first or second predetermined type, to wit, type "A" or "B". String 200 can be further characterized as being composed of a plurality of string fragments, where each fragment is a maximal sequence of elements of the same type. Further, all elements of the string are contained in the fragments. String 200 therefore consists of string fragments 202, 204, 206, 208 and 210. For example, fragment 204 consists of the sequence of elements B3, B4, B5 and B6 which are, of course, all of type "B". Each string fragment has a head element and a tail element. In the case of fragment 204, elements B3 and B6 are respectively the head and tail elements of that fragment. In the case of fragment 206 which consists of the sole element A7, that element can be viewed as both the head and tail of the fragment. A further property of the fragments is that the fragments immediately adjacent a subject fragment in the string are composed of elements of a different type than the subject fragment. For example, fragments 206 and 210 are composed of type "A" elements and are the fragments immediately adjacent to fragment 208, the latter fragment being composed of the different type "B" elements.

As stated above, the method of the present invention operates to partition a data string, such as string 200, which is composed of elements of two types, into two substrings each of which is composed of elements of only one type. The result of partitioning string 200 is illustrated in FIG. 4b. There, string 200 has been partitioned into two substrings 220 and 222. Substring 220 is composed of fragments 202, 206 and 210 each of which have in turn composed only of "A" type elements. Similarly, substring 222 is composed of fragments 204 and 208 each of which is in turn composed only of "B" type elements. The distinctive characteristic of each substring 220, 222 is that the head element of each fragment includes a pointer identifying the tail element of the next fragment having elements of the same type as itself. For example, with respect to substring 220, element A11, which is the head element of fragment 210, includes a substring pointer 224 identifying element A7 which is the tail element of fragment 206. Similarly, element A7 which is also the head element of fragment 206 includes a substring pointer 226 identifying element A2 which is the tail element of fragment 202. The element identities corresponding to pointers 224 and 226 could replace the old values in pointer 162 at elements A11 and A7 respectively. Alternatively, an additional pointer could be allocated for each fragment head element to carry the substring pointer and thereby preserve the information pertaining to the structure of the original string.

Considering the distinctive substring characteristic of each fragment head element carrying a substring pointer identifying the next fragment tail element, one method for string partitioning is to pass the identity of each fragment tail element in the original string to the head element of the next fragment, further from the true head element, composed of the same type elements as the tail element. Such a method is subject to the constraint that each element only knows, by its pointer 162, the identity of the immediately succeeding element in the original string.

One straight forward but time consuming method for the passing of fragment tail element identities is to pass them, element-to-element, "down" the string in the direction away from the true head element of the string. Where, as described above, each string element is stored in the memory of a different processor of the distributed processing system, passing of tail element identities is accomplished by passing the identities from processor to processor in accordance with the structure of the string. For example, as an initial step, the fragment head elements identify themselves as such by comparing their type with that of the immediately succeeding element in the string. Then, the pointer carried by each fragment head element identifying the immediately succeeding element in the original string, also identifies the tail element of the next adjacent fragment. This pointer identity could be uniquely tagged and then passed down the string until it reached the next fragment head element. Note that since each element generally only knows the identity of the immediately succeeding element, such passing down the string is actually accomplished by each element acquiring from the element immediately succeeding it the identity being passed. Since it would be necessary to perform successive passes until these tail element identities reach the appropriate fragment head element, the number of discrete passes would be equal to the length of the longest fragment through which a tail element identity must be passed. The time required for each pass is a message cycle. A message cycle, in the distributed processing system, is the time required for a collection of messages to be communicated to their respective destinations. In the case of string 200, the longest fragment is fragment 204 and the time required to partition string 200 using the element-to-element passing method would be proportional to the four message cycles required to pass the identity of tail element A2 from element B3 to element A7. In general, then, the time to partition a string by this method is directly proportional to the number of elements in the longest fragment. It is noted that one long fragment in a string composed of otherwise short fragments would determine the partitioning time for the entire string.

The method of the present invention also provides the head element of each fragment with the identity of the tail element of the next fragment in the string composed of elements of the same type. However, the method achieves this in fewer message cycles and, therefore, in a shorter time than the passing method described hereinabove.

Figure 5:
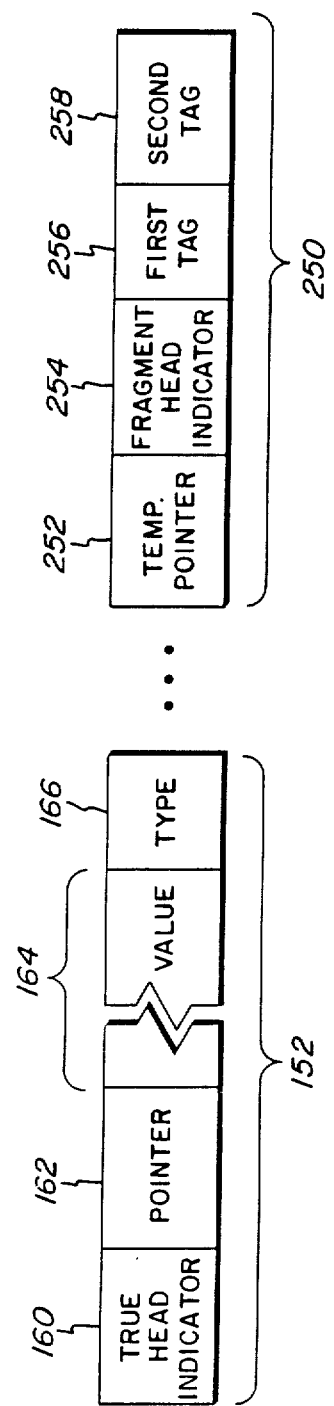
FIG. 5 illustrates a data structure, for a data element, preferred for the practice of the method of the present invention.

In practicing the present method on a distributed processing system, it is preferred herein to maintain undisturbed the information originally comprising each string segment, i.e. element 152 as illustrated in FIG. 3 and described hereinabove. To achieve this end, an additional data structure is constructed for each string element. This additional data structure "shadows" or "parallels" the original element structure and is subjected to changes in its content required by the practice of the method of the present invention. FIG. 5 illustrates both the original string element structure shown in FIG. 3 and an additional data structure 250 which parallels original element 152. Structure 250 includes a second or temporary pointer 252 for carrying an element identity determined by the inventive method. Structure 250 further includes a fragment head element indicator 254 which when set, indicates that the element it is associated with is the head element of a string fragment. The additional data structure also includes a first tag 256 and a second tag 258. Tags 256 and 258 are in an unset condition at the commencement of the present method. The method, in the course of execution, may require one or the other of the two tags or the two head indicators 160, 254 to be set. The status as to whether indicators 160 or 254 or tags 256 or 258 are unset or set is determined by whether an indicator or tag carries a first or a second predetermined bit value. For example, the unset or set condition may be respectively indicated by the presence of a "0" or "1" bit.

As stated above, each string element is stored in the memory of a different processor of the distributed processing system. Before proceeding with the method of the present invention, it is first necessary to create in the respective processor memories, the additional data structure 250 for each element. It is preferred that data structure 250 be created in the same processor memory as its corresponding string elements. It is further preferred that string elements 152 and data structures 250 be aligned in the respective processor memories. That is, each portion of element 152 and structure 250 is at the same memory address location in every processor memory. Such alignment in memory is necessary because of the SIMD format preferred herein. As a result, a single instruction applied to all processors can initiate an operation by each processor on the data at the same memory address location.

Figure 7:
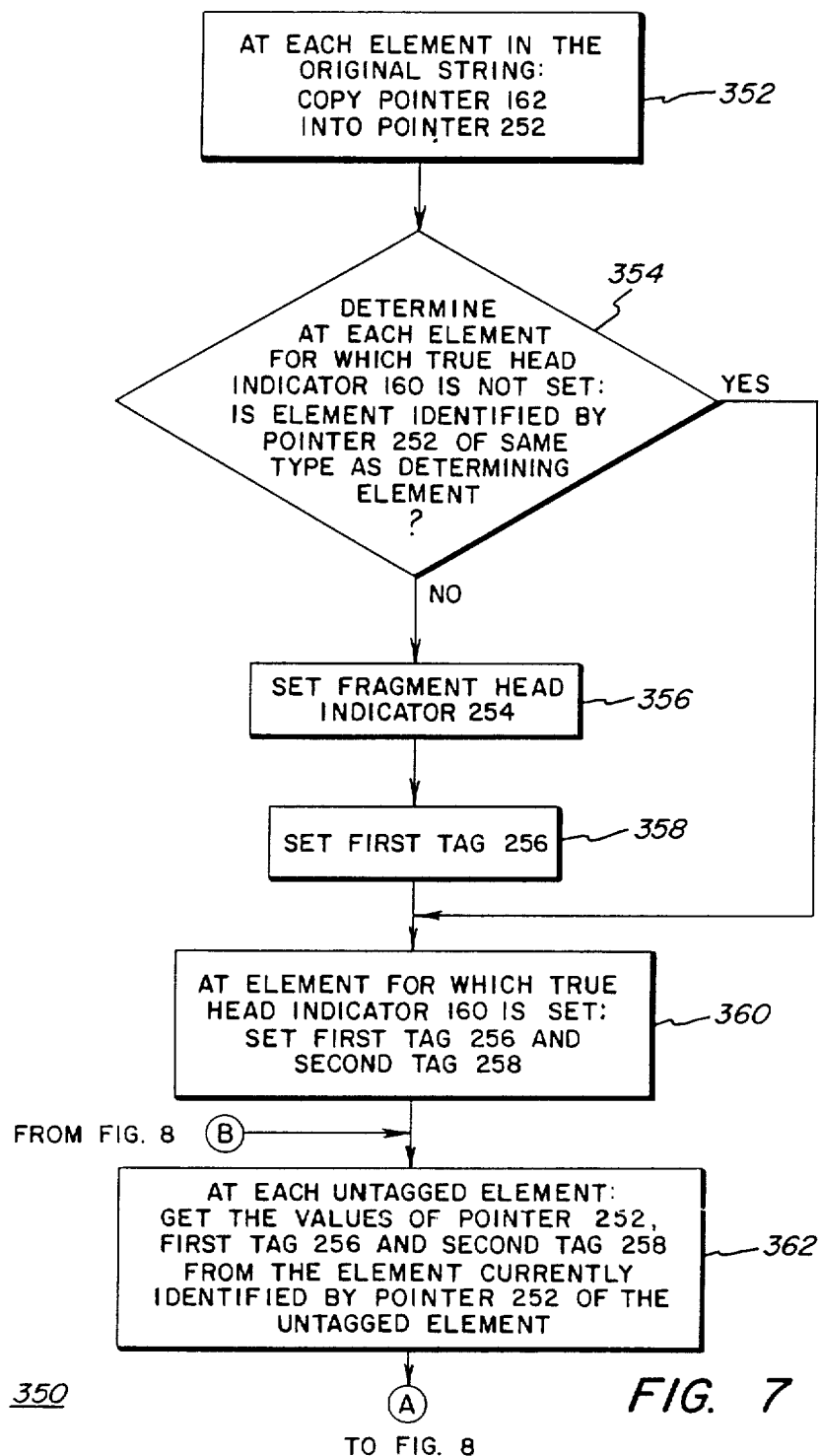
FIGS. 7 and 8 illustrate a preferred embodiment of the method of the present invention in flowchart form.
Figure 8:
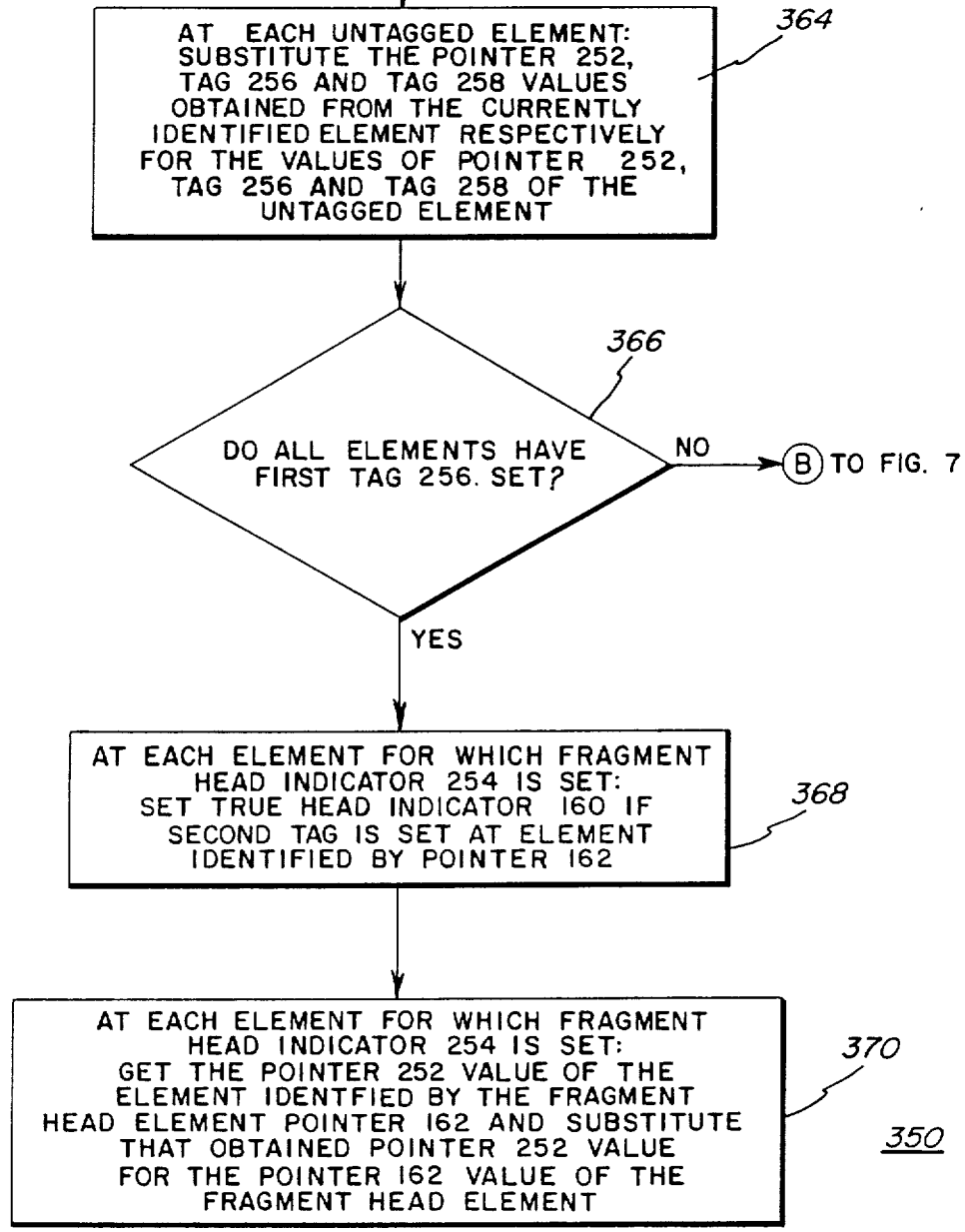

An embodiment of the method of the present invention is illustrated in FIGS. 6-9. The successive portions of FIG. 6, i.e. 6a, 6b, 6c and 6d, and FIG. 9 illustrate successive steps of partitioning string 200 (FIG. 4a) in accordance with the present method. FIGS. 7 and 8 present the illustrated embodiment of the method in flowchart form. Referring to FIG. 6a, a column 300 contains a list of the elements of string 200. The four columns adjacent to string 200 are allocated to indicate information contained in data structure 250 for each string element. Thus, columns 302, 304, 306 and 308 are respectively allocated to indicate temporary pointer 252, fragment head indicator 254, first tag 256 and second tag 258. FIGS. 6b through 6d have the same column structure.

Referring also to FIG. 7, the illustrated embodiment of the partitioning method, shown in a flowchart 350, commences with step 352 in which, at each element in the original string, the value of pointer 162 is copied into temporary pointer 252. FIG. 6a illustrates performance of step 352. As described above, at each element in the original string, pointer 162 carries the identity of the immediately succeeding element in the string. Thus, column 302 in FIG. 6a contains for each string element, the identity of the immediately succeeding element in the string. For example, the temporary pointer for element A7 contains the identity of elment B6. As is readily apparent to one skilled in the art, in practicing the method of the present invention on a distributed processing system, such as system 100, in order to execute step 352 all processors would be simultaneously instructed to copy the information stored at the memory address location corresponding to pointer 162 into the memory address location corresponding to pointer 252. Each subsequent step of the method as described hereinbelow is similarly executed on the distributed processing system by providing the same instruction to all elements. Note however that at many subsequent steps only certain elements actually carry out the provided instruction depending on the determination of a condition.

Referring again to FIG. 7, following step 352, step 354 is performed in which it is determined at each element in the string, except the true head element, if its type is the same as the type of the element identified by pointer 252, the element types being indicated by their respective type fields 166. Note that at this point in the method, pointer 252 of each element identifies the immediately succeeding element in the original string. Thus, for step 354, it is determined at each element whether the immediately succeeding element is of the same type as itself. If it is determined that the immediately succeeding element is not of the same type, steps 356 and 358 are performed in which both fragment head indicator 254 and first tag 256 are respectively set for the element at which the determination was made. The results of performing steps 354, 356 and 358 are illustrated in FIG. 6b. Where it is determined at a first element that its type is different than a second, immediately succeeding element, the first element is the head element of a fragment. For example, elements B3, A7, B8 and A11 are respectively the head elements of fragments 204, 206, 208 and 210 (FIG. 4a). This is indicated in FIG. 6b, as required by step 356, by setting fragment head indicator 254 for elements B3, A7, B8 and A11 (indicated by an "S" in column 304 for each of these elements). First tag 256 is also set for each of these elements as required by step 358, this being indicated by an "S" in column 306 for each such element. Note that while the instruction associated with step 354 is applied to all processors, its performance by each processor is subject to the determination that true head indicator 160 is not set for the element carried by the processor.

Referring again to FIG. 7, following step 358 or if, at step 354, it is determined that an element is of the same type as its immediately succeeding element, step 360 is performed. At step 360, first tag 256 and second tag 268 are set at the true head element, i.e. the element for which true head indicator 160 is set. The result of performing step 360 is also illustrated in FIG. 6b where an "S" appears in columns 306 and 308 for element A1 to indicate tags 256 and 258 are set.

Flowchart 350 continues, following step 360, with step 362 at which each untagged element, i.e. at each element for which the first tag is not set, gets the values of pointer 252, tag 256 and tag 258 from the element currently identified by pointer 252 of the untagged element. Then, at step 364 (FIG. 8), the untagged element substitutes the values of pointer 252, tag 256 and tag 258 obtained in step 362 respectively for its own pointer 252, tag 256 and tag 258. Upon commencing performance of step 362, the untagged/tagged status of each element is as shown in FIG. 6b. As can be seen, elements A2, B4, B5, B6, B9, B10, A12 and A13 are untagged. As a result, each of these elements performs step 362. As an example, with respect to element B9, the element currently identified by its pointer 252 is element B8. Therefore, at step 362, the processor associated with element B9 gets from the processor associated with element B8 the values of pointer 252 (identity of element A7), tag 256 (set) and tag 258 (unset). Then, at step 364, the element B9 processor substitutes the values obtained from the element B8 processor in step 362 as the new values of pointer 252, tag 256 and tag 258 for element B9. This is illustrated in FIG. 6c where for element B9, A7 is entered in column 302 as the value of pointer 252 and tag 256 is indicated as set (column 306).

With respect to element A2 at the commencement of step 362, element A1 is the element currently identified by pointer 252 of element A2. As a result of performing steps 362 and 364, tags 256 and 258 are both set for element A2 (FIG. 6c). Also, since temporary pointer 252 of element A1 is blank, element A2 substitutes a blank value for its pointer 252.

Following completion of step 364, it is determined, at step 366 (FIG. 8), whether all elements in the original string respectively have their first tags set. If not, then the method returns to step 362. In the case of string 200, it is necessary to repeat steps 362 and 364 since elements B5, B6, B10 and A13 remain untagged (FIG. 6c). Steps 362 and 364 are therefore performed again for these untagged elements, the results being illustrated in FIG. 6d. Following this repetition of steps 362 and 364, first tag 256 is set at all elements.

Upon satisfaction of the condition at step 366, flowchart 350 continues with step 368 wherein true head indicator 160 is set at each fragment head element that determines second tag 258 is set at the element identified by pointer 162 of the fragment head element. As previously described, the element identified by pointer 162 is the element immediately succeeding the fragment head element in the original string. Referring again to FIG. 6d, element B3 is the only fragment head element whose pointer 162 identifies an element the second tag of which is set. As described above, step 360 set the second tag at the true head element. Subsequent steps 362, 364 and 366 serve to pass the second tag down the string to the tail element of the fragment containing the true head element. As a result, the method of the present invention assures that upon reaching step 368, the second tag is et at the tail element of the fragment containing the true head element. Then, in performing step 368, it is determined at elements B3, A7, B8 and A11, each a fragment head element, whether tag 258 is respectively set at elements A2, B6, A7 and B10. The second tag is only found to be set at element A2. As a result, it is determined that element B3 is the true head element of one of the two substrings into which the original string is being partitioned. Since it is preferred herein to not preserve the structure of the original string after partitioning, the true head indicator is set in step 368 at the appropriate substring head element (element B3 in the illustrated example). Note that element A1 is necessarily the true head element of the other substring, this being indicated by true head indicator 160.

A survey of FIG. 6d reveals that pointer 252 of each element immediately succeeding a fragment head element identifies the tail element of the next fragment composed of the same type element as the fragment head element. This result is a basic property of the method of the present invention. For example, element B10 is the immediately succeeding element to fragment head element A11. Pointer 252 of element B10 identifies element A7 which is the tail of the next "A" type fragment in the string. Thus, following step 368, step 370 is performed in which each fragment head element gets the pointer 252 value from the immediately succeeding element (i.e. the element identified by pointer 162) and substitutes the obtained pointer 252 value as a new pointer 162 value. Thus, at each fragment head element, the pointer 252 value at the immediately succeeding element is substituted as the new pointer 162 value of the fragment head element. For example, pointer 162 of element A11 identifies element B10, the immediately succeeding element. The value of pointer 252 of element B10, i.e. element A7, is substituted as the new pointer 162 value at element A11. Note that when step 370 is performed at element B3, that element gets a blank value as pointer 252 of its immediately succeeding element (A2). Thus, element B3 substitutes a blank for its pointer 162 is performing step 370, this being a correct result since element B3 is the true head element of a substring.

Upon completion of step 370, pointer values 162 define the two substrings into which the original string was to be partitioned. This is illustrated in FIG. 9 which lists the original string elements and the pointer 162 value for each following completion of step 370. The true head indicator is found to be set at the head element of each substring.

As described above, where a data string is partitioned simply by passing the appropriate fragment tail identities element-to-element "down" the string, the time required for partitioning is proportional to the number of elements in the longest fragment, the number of required message cycles being equal to that number of elements. Note that in the simple element-to-element passing method, it is first necessary to identify fragment head elements, as in the method of the present invention. Following arrival of the tail identities at the fragment head elements of the same type, it may also be necessary to perform a substring forming step as in the method of the present invention. In actual practice, data strings subject to partitioning are usually substantially longer than the exemplary strings described herein. In such a case, the time required for steps performed before and after passing of the tail elements is very small compared to the time required for message cycles to pass the tail identities.

The method of the present invention provides the advantage of reducing the number of message cycles required to pass the tail element identities, that number of message cycles being proportional to [$\log_2(n)$] where n is the number of elements in the longest fragment. For example, as described above, fragment 204 is the longest fragment is string 200, having four elements. The element-to-element passing method requires four message cycles to pass the identity of tail element A2 to fragment head element A7, through fragment 204. The method of the present invention only requires two ($=\log_2(4)$) message cycles, i.e. those illustrated in FIGS. 6c and 6d. It is again noted that the time required for each message cycle will vary according to the hardware that supports communication between the processors of the distributed processing system and the particular pattern of such communication as required by the data.

While a method for partitioning a data string according to whether elements are of a first or second type has been disclosed herein, the invention is not so limited. By repeated partitioning, an original data string may be partitioned into substrings of many different types. For example, if an original substring contains first, second, third and fourth types of elements, an initial partitioning could be performed to form two substrings, one substrings being composed of first and second type elements and the other substring composed of third and forth type elements. Next, each substring would be concurrently partitioned into two substrings each composed of elements of a single type.

With respect to the method described hereinabove, the fragment head indicators are set at step 356 (FIG. 7) and performance of steps 368 and 370 (FIG. 8) is limited to elements in which the fragment head indicator is set. The method of the present invention is not so limited. The fragment head elements are identified by each element determining whether the immediately succeeding in the original string is of the same type as itself. As a result, steps 368 and 370 could instead be subject to the condition that they be performed only by those elements that determine they are of a different type than the immediately succeeding element, as defined by pointers 162. There would then be no need for fragment head indicators.

With respect to the method described in flowchart 350, setting true head indicator 160 at the substring head element in step 368 and substitution of new values for pointers 612 at the fragment head elements in step 370 are steps effective to both form the two substrings and permanently abandon the structure of the original string. The invention is, however, not so limited. It is instead possible, if so desired, to maintain the original string structure by simply copying that structure into another memory location before initiating the partitioning method. Thus, in such a case, the element 152 structure would be copied at each processor into a predetermined address location of the processor's dedicated memory prior to partitioning.

At step 368 of the illustrated embodiment described hereinabove, the true head indicator was set at a fragment head element if that element determined the second tag was set at the immediately succeeding element. Where, as preferred herein, the unset or set status of tags and indicators are indicated by presence of '0' or '1' bit, respectively, a simpler means of performing step 368 is available. That step can simply be performed by each fragment head element substituting the second tag value of the immediately succeeding element for its own (the fragment head element's) true head indicator. Thus, if the second tag is set at the immediately succeeding element, a '1' bit will be carried there as that tag value. Then, the fragment head element would substitute that '1' bit as its own true head indicator, thereby setting its true head indicator, which is the desired result.

While the illustrated embodiment of the present invention comprises a plurality of method steps presented in a sequence the invention is not so limited. Some steps may be performed in parallel with others where such steps do not depend on the results of performing previous steps. For example, steps 356 and 358, which are performed by elements determined in step 354, can be performed simultaneously. Similarly, "getting" a set of values and "substituting" those same values are respectively performed in steps 362 and 364, those operations being broken into two steps to enhance their clarity. However, the getting and substituting can be performed as a single step. Note further, where such steps can be performed in parallel, if it is instead desired to perform them sequentially, they need not be performed in the sequence illustrated and described hereinabove.

While a illustrated embodiment has been described hereinabove for the partitioning of a single data string, the invention is not so limited. A plurality of discrete data strings, each with its own true head element, may be stored in the processors of the distributed processing system. Then, by performing the steps of the method of the present invention in parallel at all processors, the plurality of data strings are partitioned in parallel with one another.

In the practice of the present invention as described hereinabove, the number of processors in the distributed processing system is greater than or equal to the number of elements in the data string(s) being partitioned. The invention is, however, not so limited. It will be apparent to those skilled in the art that by appropriately storing more than one string element at predetermined address locations in the memory of each processor, string partitioning may be performed on strings composed of a number of elements greater than the number of processors.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. An automated method implemented on a distributed data processing system for partitioning an original string of successive data elements into two substrings, each said element comprising a first pointer having a value that identifies an immediately succeeding element in said original string closer to a true head element thereof, each said element being of a first type or a second type as indicated by a type field value of said element, said original string being composed of at least one string fragment, each said fragment being composed of a sequence of said elements of the same type, the element type in each said fragment being different from the element type in the fragments immediately adjacent thereto in said original string, each said substring having only elements of the same type, each step of said method being performed in parallel at all of said elements in said original string, said method comprising using said processing system to perform the steps of:

(a) copying, at each said element, the value of said first pointer into a second pointer thereof, said second pointer identifying elements;

(b) determining at each said element, except said true head element, if the type field value thereof is the same as the type value of the immediately succeeding element;

(c) setting a first tag at all said elements that determined in step (b) that the immediately succeeding element is not the same type as said elements, respectively, each said element so setting said first tag being a string fragment head element, and not setting the first tag at all said elements that determined in step (b) that the immediately succeeding element is the same type;

(d) setting said first tag and a second tag only at said true head element, each said element having said first tag set or not set being respectively a tagged or untagged element;

(e) getting, at all said untagged elements, the values of said first and second tags and said second pointer from the element currently identified by said second pointer of said untagged element;

(f) substituting, for said first and second tags and said second pointer at all said untagged elements, the values of said first and second tags and said second pointer, respectively, obtained in step (e) from said currently identified element;

(g) repeating steps (e) and (f) until all of said elements in said original string are tagged;

(h) determining only at each said fragment head element if said second tag of the immediately succeeding element in said original string is set, said fragment head element being a substring head element if said second tag of the immediately succeeding element in said original string is set, said fragment head element not being a substring head element if said second tag of the immediately succeeding element in said original string is not set;

(i) getting, only at each said fragment head element, the second pointer value of said immediately succeeding element in said original string, the second pointer value so gotten being a substring pointer of said fragment head element that identifies a tail element of a next string fragment having the same type elements as the fragment head element; and (j) forming two said substrings by joining each said fragment head element to the fragment tail element identified by the substring pointer of said fragment head element, said true head element being the head element of one of said substrings, said substring head element identified in step (h) being the head element of the other one of said substrings.

2. The method of claim 1 wherein a true head indicator is set at said true head element of said original string, step (h) further comprising:

setting said true head indicator only at said substring head element;

step (i) further comprising:

substituting said substring pointer for said first pointer only at said fragment head elements; and each said substring having the true head indicator set at the head element thereof, said first pointer of each said element identifying the immediately succeeding element in said substring.

3. The method of claim 1 wherein there are a plurality of said original data strings, the steps of said method being performed in parallel at all of said elements of said plurality of original strings to partition each said original string.

4. A method for partitioning an original string of successive data elements into two substrings on a distributed processing system, each said element comprising a first pointer having a value that identifies an immediately succeeding element in said original string closer to a true head element thereof, each said element being of a first type or a second type as indicated by a type field value of said element, said original string being composed of at least one string fragment, each said fragment being composed of a sequence of said elements of the same type, the element type in each said fragment being different from the element type in the fragments immediately adjacent thereto in said original string each said substring having only elements of the same type, said processing system comprising a plurality of processors intercoupled to communicate with one another, each said processor comprising processing means for performing arithmetic and logic functions and memory means for storing information, said processing system being responsive to a single sequence of instructions applied in parallel to all of said processors, said method comprising using said processing system to perform the steps of:

(a) storing each said element of said original string in the memory means of a different one of said processors;

(b) copying, at each said element, the value of said first pointer into a second pointer thereof, said second pointer identifying elements;

(c) determining at each said element, except said true head element, if the type field value thereof is the same as the type value of the immediately succeeding element;

(d) setting a first tag at all said elements that determined in step (c) that the immediately succeeding element is not the same type as said elements, respectively, each said element so setting said first tag being a string fragment head element and not setting the first tag at all said elements that determined in step (c) that the immediately succeeding element is the same type;

(e) setting said first tag and a second tag only at said true head element; each said element having said first tag set or not set being respectively a tagged or untagged element;

(f) getting, at all said untagged elements, the values of said first and second tags and said second pointer from the element currently identified by said second pointer of said untagged element;

(g) substituting, for said first and second tags and said second pointer at all said untagged elements, the values of said first and second tags and said second pointer, respectively, obtained in step (f) from said currently identified element;

(h) repeating steps (f) and (g) until all of said elements in said original string are tagged;

(i) determining only at each said fragment head element if said second tag of the immediately succeeding element in said original string is set, said fragment head element being a substring head element if said second tag of the immediately succeeding element in said original string is set, said fragment head element not being a substring head element if said second tag of the immediately succeeding element in said original string is not set;

(j) getting, only at each fragment head element, the second pointer value of said immediately succeeding element in said original string, the second pointer value so gotten being a substring pointer of said fragment head element that identifies a tail element of a next string fragment having the same type elements as the fragment head element; and (k) forming two said substrings by joining each said fragment head element to the fragment tail element identified by the substring pointer of said fragment head element, said true head element being the head element of one of said substrings, said substring head element identified in step (i) being the head element of the other one of said substrings.

5. The method of claim 4 wherein the values of said first and said second pointers each identify the processor in whose memory means the string element identified by said first or said second pointer is stored.

6. The method of claim 4 wherein said elements of said original string are aligned in the respective memory means of said processors such that information comprising each said element is stored at the same address locations.

7. The method of claim 4 wherein a true head indicator is set at said true head element in said original string, step (i) further comprising:
 setting said ture head indicator only at said substring head element;

step (j) further comprising:
 substituting said substring pointer for said first pointer only at said fragment head elements; and
 each said substring having the true head indicator set at the head element thereof, said first pointer of each said element identifying the immediately succeeding element in said substring.

8. The method of claim 4 wherein there are a plurality of said original data strings, the elements of said plurality of original strings being stored in the respective memory means of different ones of said processors, the steps of said method being performed in parallel for all of said elements of said plurality of original strings to partition each said original string.

* * * * *